Patented Nov. 8, 1932

1,886,982

UNITED STATES PATENT OFFICE

OTTO SIMON, OF BERLIN, GERMANY

PROCESS OF PRODUCING CEMENTS FOR TEETH

No Drawing. Application filed May 25, 1929, Serial No. 366,090, and in Germany May 26, 1928.

My invention relates to cements, and the method of improving permanent cements for filling teeth, that is, those cements as distinguished from temporary fillings.

These permanent cements are primarily silicious cements, and are produced by fusing their ingredients and then grinding them for use, or they are made by precipitation.

The invention also applies to zinc phosphate cements.

The invention consists in incorporating in such cements a water-repellant substance, as fats, oils, resin, wax, tar and constituents thereof, and bituminous materials.

To the water-repellant substance there may be added additional materials, as salts of calcium, magnesium, strontium, beryllium, with or without acids.

The addition materials may be mixed with the cement at any time.

Other water repellant substances such as paraffine, beeswax, animal and vegetable oils, fats and paraffine oil may be added during the grinding of the cement to powder for use or after the powder has been ground and when mixing the cement just before filling the cavity.

The salts may be added in solution, or in the solid state, after they have been ground. The preferred salts to be used are the chlorides, but nitrates, acetates, citrates and tartrates also may be used. The treatment or the introduction of acids may also be done before or during the preparation or production or use of the cements. Also the treatment of some constituents of the cement-mixture with acid can be done.

It is advantageous to use oils, principally vegetable and animal oils—or acids or salts of them—which are treated with acid. This treatment with acid may be done in treating separately the oils or the oil-mixtures with an acid, hydrochloric acid, sulphuric acid, phosphoric acid or by the addition of oil and acid to the cement.

For instance sulphonated castor oil or the sulphonic acid of castor oil or ricinates are used. Under certain circumstances basic agents are added, for example calcium-compounds; if free acid is present it may be neutralized in this way. With oily derivatives of oils excellent effects are obtained even while working with filling materials, for example siliceous or colouring additions or also metals powdered or disintegrated by other means or mixtures of filling materials, for example with zinc-cement.

The addition of or treatment with an alcohol has been found to be particularly advantageous. Further it is advisable to add or treat with sodium-silicate (soluble glass, water-glass) e. g. ricinate or sulphurous ricinate and water. Ricinates and sulfo-rincinates are metal compounds respectively of ricinoleic acid or castor oil and ricinoleic acid and sulfuric acid.

The substances being added, bituminous substances etc. salts, alcohols and water-glass may be added to the total mass of the cement to be worked or to only a part or to individual component parts of the tooth-cement and then mixed with another portion of the untreated cement or the other component-parts, used for treatment.

Thus the substances may be added to the working up liquid or the liquid mass may be used as working up liquid, so that it is possible to use oils or oil derivatives treated with phosphoric-acid, castor oil-sulphurous-acid mixed with phosphoric-acid or mixtures of phosphoric-acid with other acids, for example sulphuric-acid, hydrochloric-acid etc. in which mixtures the oils or other water rejecting substances may be contained. The working up liquid can further contain silicic-acid and under certain circumstances soluble glass as main component parts or as admixing substance.

It is particularly advantageous to grind tooth-cement for example molten silicate-cement in the usual manner, then to work up same with the improving materials which are to be added and finally to subject this mixture to a further grinding. Naturally it is also possible to treat the individual component-parts of the cement in the manner described. The second grinding is then preferably carried out together with the other component-parts of the cement which are still lacking.

The following process is entirely satisfactory. A paste is made from tooth-cement or component-parts of the tooth-cement by working up with the improving-materials, bituminous substances, salts and grinding, this paste is added to the tooth-cement ready for use before it is worked.

The incorporating of the bituminous substances for example paraffin etc. may be facilitated, whilst at the same time also maximum effects in respect to improvement are obtained, by subjecting the tooth-cement or tooth-cement component-parts to a disintegrating treatment with acid, then working up with the improving substances and grinding, whereon the tooth-cement, if necessary after mixing with untreated cement, or the lacking component-parts are added for use. Further the formation of the paste which may serve as admixture to cement ready for use is considerably facilitated by this method of working.

As acids suitable for the treatment may be mentioned by way of example hydrochloric-acid, nitric-acid, acetic-acid, citric-acid or also any other inorganic or organic acids.

Another method of making the incorporation of the bituminous substances particularly easy, if necessary in supplementing the above described method or treatment with acid consists in that using a suitable solvent, for example benzole, alcohol acetone, dissolving the bituminous substances therein and mixing the solution with the tooth-cement or individual component-parts, whereafter the solvent may if necessary be eventually entirely or partly evaporated and recovered. Under certain circumstances a mixture of various solvents may be used, for example a mixture of alcohol and benzole.

By means of the new process tooth-cements are obtained which are very considerably improved. The cement or dental-cement filling prepared according to the new process is remarkable for its extremely high density and hardness. The tooth-filling is much more resistant against the attacks of acids or other chemical acting substances in the foods and in the saliva. It is even possible to say that the cement is practically immune against the action of these substances. Further its volume is practically unchangeable and finally a particularly important advantage consists in the fact that owing to the above described admixtures an emission of heat while hardening the cement is almost entirely suppressed. Moreover a particularly high resistance against changes of temperature is imparted to the tooth-cements.

I claim:

An improved dental cement comprising a mixture of a known cement from the group consisting of silica cements and phosphate cements and a substance from the group consisting of sulpho-ricinates and sulphonated castor oil.

In testimony that I claim the foregoing as my invention, I have signed my name thereto.

OTTO SIMON.